United States Patent
Groves et al.

(10) Patent No.: US 10,306,319 B2
(45) Date of Patent: May 28, 2019

(54) COLLABORATION BETWEEN A BROADCASTER AND AN AUDIENCE FOR A BROADCAST

(71) Applicant: Google LLC, Mountain View, CA (US)

(72) Inventors: Loren Groves, San Francisco, CA (US); Ming Zhang, Sammmish, WA (US); Matthew John Leske, Stockholm (SE); Nadim Raad, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 153 days.

(21) Appl. No.: 14/481,432

(22) Filed: Sep. 9, 2014

(65) Prior Publication Data
US 2019/0052934 A1    Feb. 14, 2019

(51) Int. Cl.
| | | |
|---|---|---|
| *H04N 21/21* | (2011.01) | |
| *H04N 21/40* | (2011.01) | |
| *H04N 21/47* | (2011.01) | |
| *H04N 21/472* | (2011.01) | |
| *H04N 21/236* | (2011.01) | |
| *H04N 21/482* | (2011.01) | |
| *H04N 7/14* | (2006.01) | |
| *H04N 21/2187* | (2011.01) | |
| *H04N 21/4788* | (2011.01) | |

(52) U.S. Cl.
CPC ......... *H04N 21/472* (2013.01); *H04N 21/236* (2013.01); *H04N 7/141* (2013.01); *H04N 21/2187* (2013.01); *H04N 21/4788* (2013.01); *H04N 21/482* (2013.01)

(58) Field of Classification Search
CPC .............. G06F 17/30026; H04H 20/30; H04H 2201/30; H04H 60/33; H04H 60/74; H04N 21/2407; H04N 21/252; H04N 21/25891; H04N 21/472; H04N 21/234363; H04N 21/2665; H04N 21/854; H04N 21/25866; H04N 21/2743; H04N 21/2187; H04N 21/231; H04N 21/4316; H04N 21/6582; H04N 21/236
See application file for complete search history.

(56) References Cited

U.S. PATENT DOCUMENTS

| | | |
|---|---|---|
| 8,667,523 B2 | 3/2014 | Gupta |
| 2002/0053077 A1 | 5/2002 | Shah-Nazaroff et al. |
| 2002/0199181 A1* | 12/2002 | Allen ..................... H04N 7/147 725/1 |
| 2009/0297118 A1* | 12/2009 | Fink .................... G06F 17/3082 386/278 |

(Continued)

*Primary Examiner* — Pankaj Kumar
*Assistant Examiner* — Alazar Tilahun
(74) *Attorney, Agent, or Firm* — IP Spring

(57) ABSTRACT

One-way streaming video broadcasts can be presented and consumed by an audience via a media player than allows annotations. If the streaming broadcast is live, or at least has not ended, an opportunity exists for the audience to collaborate with the broadcaster and/or contribute to the broadcast. Such can be accomplished by annotating the presentation of the video broadcast with an object that, when selected, facilitates transmission of a video feed associated with the audience member to the broadcaster. The broadcaster can receive and include this video feed into the video broadcast.

21 Claims, 10 Drawing Sheets

(56) References Cited

U.S. PATENT DOCUMENTS

| | | | |
|---|---|---|---|
| 2009/0300520 A1* | 12/2009 | Ashutosh | H04L 12/1831 |
| | | | 715/756 |
| 2011/0202687 A1 | 8/2011 | Glitsch et al. | |
| 2013/0188923 A1* | 7/2013 | Hartley | H04N 9/87 |
| | | | 386/241 |
| 2014/0019882 A1* | 1/2014 | Chew | G06Q 10/10 |
| | | | 715/753 |
| 2015/0043892 A1* | 2/2015 | Groman | H04N 21/47205 |
| | | | 386/278 |
| 2015/0082203 A1* | 3/2015 | James | H04N 21/23418 |
| | | | 715/756 |
| 2015/0244754 A1* | 8/2015 | Beckham, Jr. | H04L 65/4076 |
| | | | 709/219 |
| 2016/0065880 A1* | 3/2016 | Pearson | H04N 5/45 |
| | | | 348/14.07 |

* cited by examiner

COLLABORATION BETWEEN A BROADCASTER AND AN AUDIENCE FOR A BROADCAST

TECHNICAL FIELD

This disclosure generally relates to mechanisms that enable broadcasters of video content to collaborate with an audience via one-way streaming broadcasts that can include content from one or more members of the audience.

BACKGROUND

Video content can be broadcast to a wide audience. A member of the audience can receive the broadcast and present the video content via a content player. In some cases, the video content being broadcast and received by the audience can be live or a recording session that records the video content in an on-going manner during the broadcast. Numerous opportunities exist to enhance the experiences of the broadcaster and the audience.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to broadcast-based collaboration. A receiving component can be configured to receive a one-way streaming broadcast of a first video. The first video can be associated with a broadcaster that broadcasts the first video to a set of receiving devices that represent an audience for the one-way streaming broadcast. A presentation component can be configured to provide a presentation of the first video. An annotation component can be configured to annotate the presentation with a first selectable object. Upon selection of the selectable object, a transmission component can be configured to transmit a second video associated with a member of the audience to the broadcaster.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
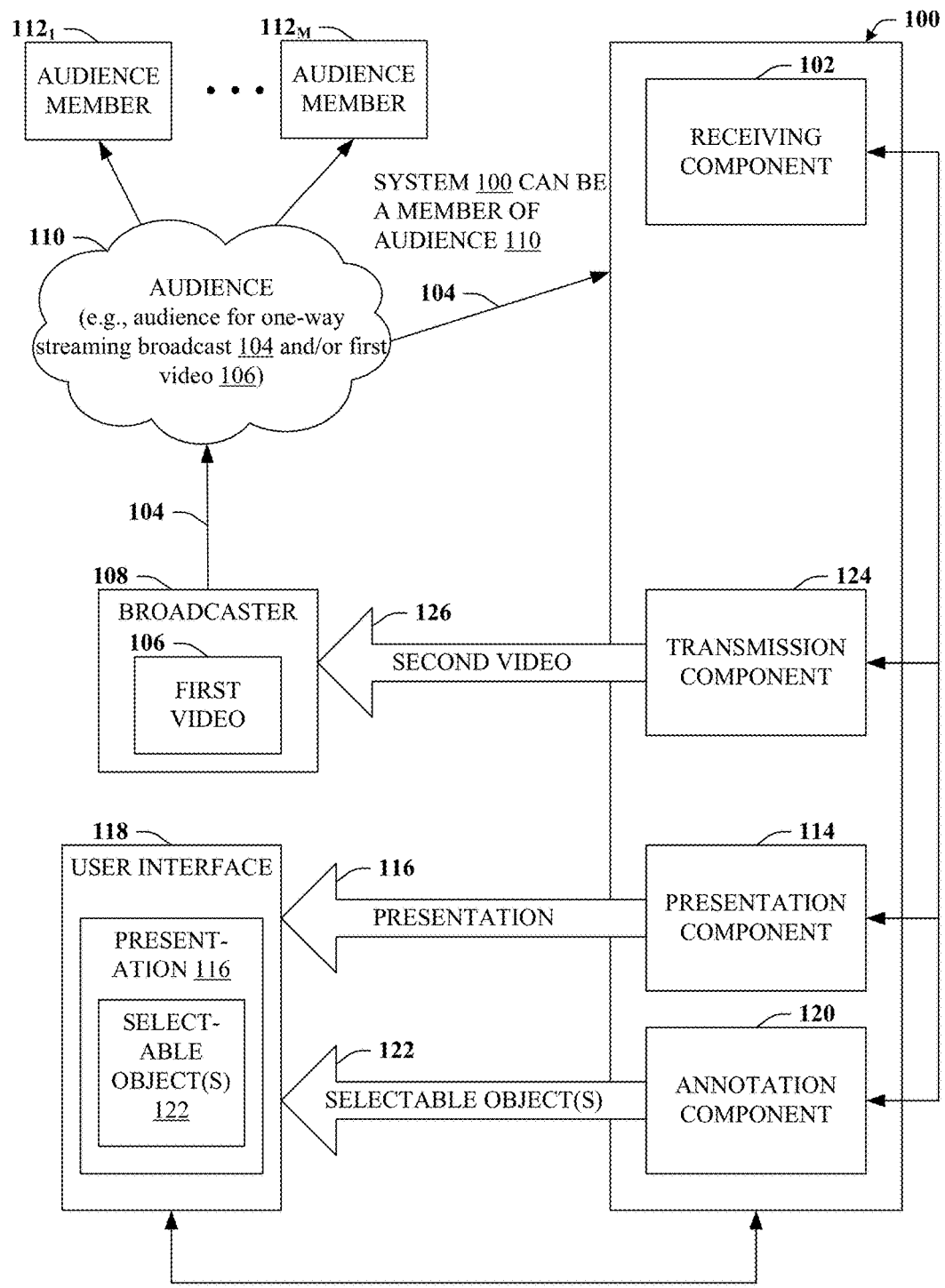
FIG. 1 illustrates a block diagram of an example system that can facilitate transmission of a video to a broadcaster in response to input to a content player that presents a one-way streaming broadcast from the broadcaster in accordance with certain embodiments of this disclosure.

As used herein, the terms "broadcaster," "audience," "party," "user," or the like are intended to refer to respective devices associated with one or more user accounts or identities. While these terms generally refer to individuals, as used herein, such can be devices, accounts, identities or other data associated with those individuals invoked or referred to by proxy. For example, a "broadcaster" can refer to a device that broadcasts a video or video stream on behalf of an individual associated with a particular broadcaster identity.

Video streaming can be divided into two broad categories: interactive and broadcast. Interactive video streams are expressly intended for collaboration between a small set of parties. Examples include video conferencing, web-chat, and video calling services. Members of interactive video stream services generally share a social relationship by which contact information has been exchanged and the parties to the interactive conversation are generally known and agreed upon before the conversation begins. Members of interactive video stream services are also typically bound by a time constraint that requires simultaneous access.

In contrast, broadcast video streams are broadcast to an audience that typically passively receive and/or consume a one-way streaming broadcast, but do not actively contribute to the content of the broadcast. A common example of a one-way streaming broadcast is a webcast. Generally, an audience for broadcast video streams can be a much larger set than is feasible for parties to an interactive call. Members of an audience for a broadcast video stream can be anonymous or unknown to the broadcaster, and the broadcast can be recorded, subsequently broadcast, and consumed by the audience much later in time.

Conventionally, both interactive and broadcast video streams can be very engaging and each one has a distinct set of advantages and disadvantages. In this regard, interactive streams can provide robust collaboration between parties, but have inherent limitations as to the number of parties that can be engaged due to social, temporal, or technological constraints. On the other hand, broadcast video streams can reach a much larger audience, but previous broadcasts have no way for the audience to join the conversation and/or fully collaborate. It is understood that broadcasting can refer to unicast schemes, multicast schemes, another suitable scheme, or combinations thereof.

The disclosed subject matter can enhance broadcast video streams to enable collaboration, which can operate to incorporate into broadcast platforms advantages (e.g., collaboration) previously available only to interactive platforms. Such can be beneficial to broadcasters and an associated audience.

For example, consider a musician who records the performance of a new song and a subsequent discussion on the inspiration for that song. Conventional broadcast platforms provide a very convenient and inexpensive way for the musician to reach a wide audience via, e.g., a webcast. The audience can present and consume the broadcast via a media player. In some cases, the broadcast might be a live performance. In other cases, the broadcast can be stored to a content hosting site or service and accessed by some portion of the audience at a later time.

With regard to the audience for the broadcast, the disclosed subject matter can annotate the presentation of the broadcast with an object (e.g., a button, icon, or other element). If the broadcast is live or is still on going, the object can be selectable. If the broadcast is not live or has ended, the object can be non-selectable (e.g., ghosted or grayed out), or might not be presented at all. Upon selection of the object (e.g., clicking a join button) a live feed of the audience member can be transmitted to the broadcaster.

With regard to the broadcaster, the live feed can be received and incorporated into the broadcast. Thereafter, the broadcast received by members of the audience can include the content recorded by the broadcaster and content or feeds from certain members of the audience (e.g., those that clicked the join button). In some embodiments, a member feed can be vetted by the broadcaster prior to inclusion in the broadcast. In some embodiments, vetting can be accomplished in a virtual "backstage" area in which the broadcaster, audience members, and other invited parties can collaborate in a manner that is not "onstage" or a part of the actual broadcast. In the backstage area, various operations associated with the member feed can be invoked by the broadcaster such as, e.g., including/excluding the member feed from the broadcast, viewing a profile associated with the member feed, muting a party, ejecting a party, and so on.

Such can be accomplished in some cases by leveraging existing technology. For example, certain media players can enable content creators to access annotations that appear during playback of the content. These annotations or similar elements can be leveraged to present the selectable object that enables an audience member to join the broadcast, as well as other objects detailed herein. Transmission of the member feed can be targeted to the broadcaster based on a uniform resource locator (URL) that is associated with the backstage area for the broadcaster that is provided by an online social service. Typically, this URL is hidden and access to the backstage area available by invite only. In the subject matter disclosed herein, this URL can be surfaced via a button or other annotation provided by a media player that presents the broadcast. In this regard, members of the audience can join the broadcast or otherwise collaborate without an express invitation delivered to a known party.

Example Audience Systems for Broadcast-Based Collaboration

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

Referring now to FIG. 1, a system 100 is depicted. System 100 can facilitate transmission of a video to a broadcaster in response to input to a content player that presents a one-way streaming broadcast from the broadcaster. The one-way streaming broadcast can be according unicast technology, multicast technology or another suitable technology for transmitting one-way streaming videos. Embodiments disclosed herein can, for example, enable a member of an audience to engage with the broadcaster (as well as the broadcaster's audience) in a new way and to transition from merely consuming content to becoming an active participant in the content. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include a receiving component 102, a presentation component 114, an annotation component 120, and a transmission component 124.

Figure 2:
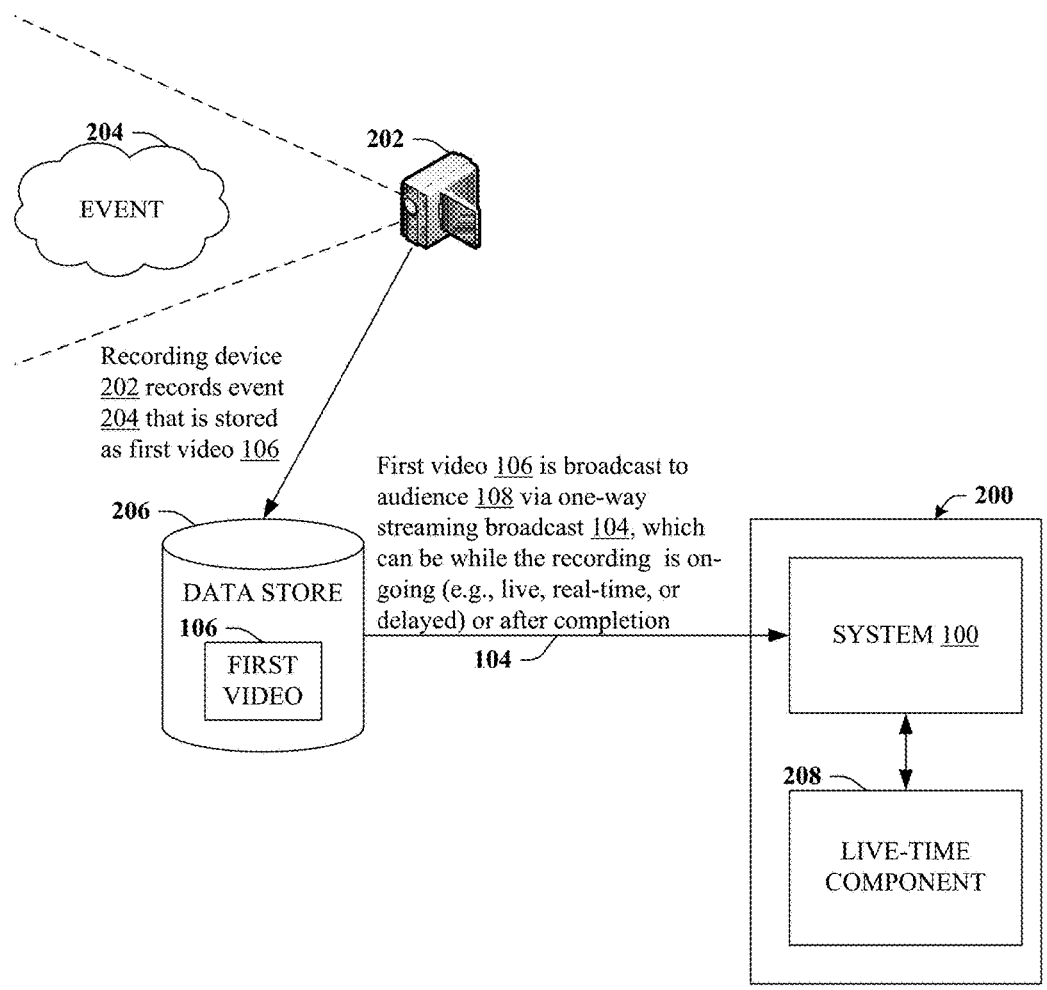
FIG. 2 provides a block diagram of an example system that can determine whether a recording of the first video has completed or on going in accordance with certain embodiments of this disclosure.

Receiving component 102 can be configured to receive a one-way streaming broadcast 104 of first video 106. For example, first video 106 can be broadcast by broadcaster 108 to a set of devices denoted herein as audience 110. Members of audience 110 are denoted audience members $112_1$-$112_M$, where M can be substantially any number and where audience 110 and/or audience members $112_1$-$112_M$ can include receiving component 102 and/or system 100. FIG. 2 provides a more detailed example of first video 106 being recorded and broadcast to receiving component 102 and/or system 100.

Presentation component 114 can be configured to provide a presentation 116 of the first video 106. For example, system 100 can be included in a computing device (not shown) and that device can have a user interface 118 that presents and/or displays presentation 116 of first video 106. User interface 118 can be associated with a content player that enables annotations to be presented, e.g., within a display area associated with the content that is presented.

Figure 3:
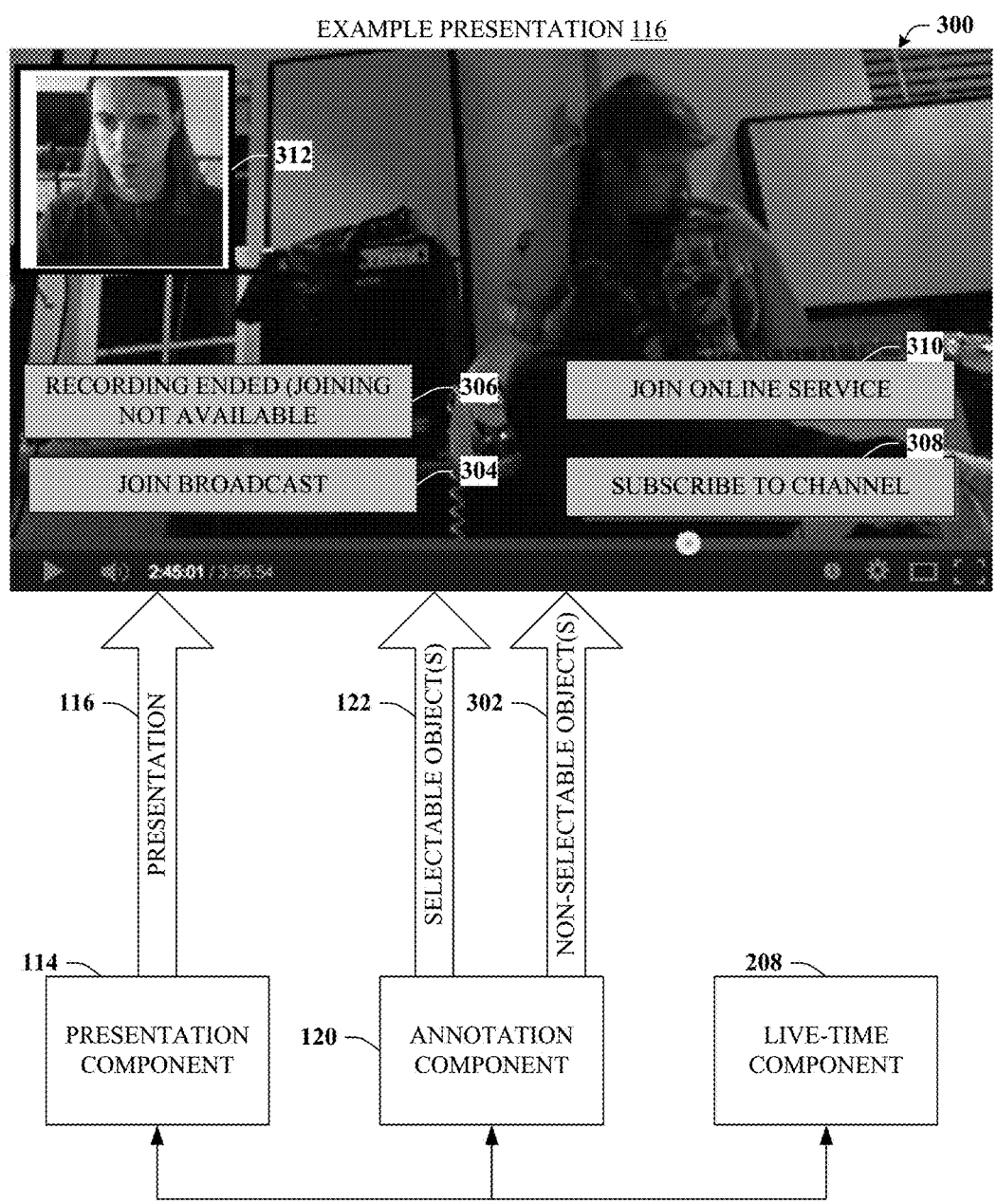
FIG. 3 represents a graphical illustration that depicts an example of the presentation of the first video annotated with various objects in accordance with certain embodiments of this disclosure.

Annotation component 120 can be configured to annotate presentation 116 with one or more selectable object(s) 122. A selectable object 122 can be, e.g., a selectable button, icon, or other graphical or textual element that, upon selection, initiates performance of an associated set of instructions or operations. For example, a first selectable object 122 can relate to joining the broadcast and another selectable object can relate to subscribing to certain content or services. A selectable object 122 can overlay a portion of the display area for presentation 116 and therefore occlude that portion of presentation 116. FIG. 3 illustrates an example presentation 116 with example annotations.

Upon selection of the first selectable object 122, transmission component 124 can be configured to facilitate or enable transmission of a second video 126 associated with a member of audience 110 to broadcaster 108. Second video 126 can be a live feed recorded by any suitable recording device such as a webcam. As further detailed infra, second video 126 can be received by broadcaster 108 and incorporated into one-way streaming broadcast 104. As a result, system 100, as well as all or a portion of audience 110 can receive second video 126.

Referring now to FIG. 2, system 200 is illustrated. System 200 can determine whether a recording of the first video 106 has completed or on going. System 100 can include all or a portion of system 100 detailed with reference to FIG. 1. For example, system 200 can include receiving component 102 that can receive one-way streaming broadcast 104 of first video 106. In some embodiments, first video 106 can represent a recording of an event 204 associated with broadcaster 108. Event 204 can be recorded by any suitable recording device 202 and stored to data store 206. First video 106 can be broadcast from data store 206 via one-way streaming broadcast 104. Data store 206 can be remote from recording device 202, e.g., located at a server for a content hosting site or service.

Broadcast 104 can occur during the recording session associated with first video 106 or after the recording session has completed. For instance, if event 204 has been previously advertised to audience 110, members might be capable of receiving broadcast 104 in real-time or as the live with respect to event 204 (e.g., via unicast, multicast, etc.). In such a case, presentation 116 of first video 106 can occur substantially simultaneous to or synchronized with event 204, although potentially delayed slightly due to transmission latency or processing (e.g., encoding or decoding) of first video 106.

In some embodiments, presentation 116 can begin at a later time with respect to the beginning of event 204, but while event 204 is on going. For example, suppose event 204 is scheduled to last three hours. Some members of audience 110 might receive a live one-way broadcast 104, as detailed previously. Other members of audience 110, however, might tune in an hour after event 204 begins. In the later case, presentation 116 is offset by an hour, but it is noted that the first two hours of presentation 116 occurs while event 204 is still on going, and therefore while data for first video 106 is being recorded.

In some embodiments, presentation 116 can occur in whole or in part after the recording session has ended. For example, a member of audience 110 might request one-way broadcast 104 several months after event 204 has concluded.

System 200 can further include live-time component 208 that can be configured to determine that a recording session for first video 106 (e.g., a recording of event 204) is on going or determine that the recording session has completed. Such determination(s) can be made based on input received from broadcaster 108, from a host associated with data store 206, or based on data included in first video 106 or one-way broadcast 104 (e.g., a header bit).

While still referencing FIG. 2, but turning back to FIG. 1, it is appreciated annotation component 120 can facilitate certain annotations based on determinations made by live-time component 208. For example, in some embodiments, annotation component 120 can annotate presentation 116 with selectable object(s) 122 in response to the live-time component 208 determining the recording session for first video 106 is on going. In some embodiments, annotation component 120 can annotate presentation 116 with non-selectable object(s) (further detailed with reference to FIG. 3) in response to the live-time component 208 determining the recording session for first video 106 has completed. Non-selectable object(s) can be substantially similar to selectable object(s) 122, yet distinct in that certain operations resulting from clicking or otherwise selecting these elements has been disabled.

Turning now to FIG. 3, graphical illustration 300 is provided. Graphical illustration 300 depicts an example of the presentation 116 of the first video 106 annotated with various objects. Graphical illustration 300 can be displayed on a user interface (e.g., user interface 118) of a device associated with a member of audience 110. The device can also include all or portions of systems 100, 200.

For example, presentation component 114 can provide presentation 116 and annotation component 120 can annotate presentation 116 with a set of objects that can be either selectable (e.g., selectable object(s) 122) or non-selectable (e.g., non-selectable object(s) 302). Live-time component 208 can determine whether a recording session for first video 106 has ended or not. If the recording session has not ended then presentation 116 can be annotated by a first selectable object 304. First selectable object 304 relates to joining the broadcast (e.g., one-way broadcast 104), which can facilitate collaboration between broadcaster 108 and a particular member of audience 110 and this collaboration can be made a part of broadcast 104 received by members of audience 110. As detailed previously, selecting first selectable object 304 can facilitate transmission of second video 126 to broadcaster 108, which can lead to collaboration aspects previously unavailable to users of broadcasting platforms.

If the recording session has ended, then annotation component 120 can annotate presentation 116 with non-selectable object(s) 302. An example is illustrated by object 306. Object 306 indicates the recording has ended so joining the broadcast is no longer available. It is understood that objects 304 and 306 are generally not presented simultaneously, as depicted for the sake of description, and thus can occupy the same location of presentation 116. For example, object 304 can be presented while the recording session is live or on going, but updated to be non-selectable upon a determination by live-time component 208 that the recording session has completed.

In some embodiments, annotation component 120 can annotate presentation 116 with a second selectable object, depicted in this example as object 308. Second selectable object 308 can, upon selection, facilitate subscribing the associated member of audience 110 to a channel associated with the broadcaster 108. Selection of second selectable object 308 can operate to subscribe one to other content or information provided by broadcaster 108 or an affiliated party.

In some embodiments, annotation component 120 can annotate presentation 116 with a third selectable object, illustrated here as example object 310. Third selectable object 310 can, upon selection, facilitates joining an online social service that provides collaboration. The online social service can be a service relating to the same platform utilized by broadcaster 108 in this example. Such a service can provide a virtual collaboration area or hangout (e.g., a backstage area) that can be accessed by the broadcaster and invitees and is further detailed with reference to FIG. 4. It is understood that objects 308 and 310 can be presented independently of a determination by live-time component 208.

While still referring to FIG. 3, but turning again back to FIG. 1, in some embodiments, receiving component 102 can receive an aggregate one-way streaming broadcast from broadcaster 108 that includes first video 106 and second video 126. Recall that, upon selection of object 304, second video 126 (e.g., a live feed from a member of audience 110) can be transmitted to broadcaster 108. Broadcaster 108 can include this feed into his or her own feed and therefore all members of audience 110 can receive this aggregate feed, including the member providing the feed and/or second video 126. Such is illustrated by element 312 that is included in presentation 116 of first video 106 (now augmented to include second video 126). It is appreciated that multiple members of audience 110 can be displayed in a similar or other suitable manner.

Example Broadcaster Systems for Broadcast-Based Collaboration

Figure 4:
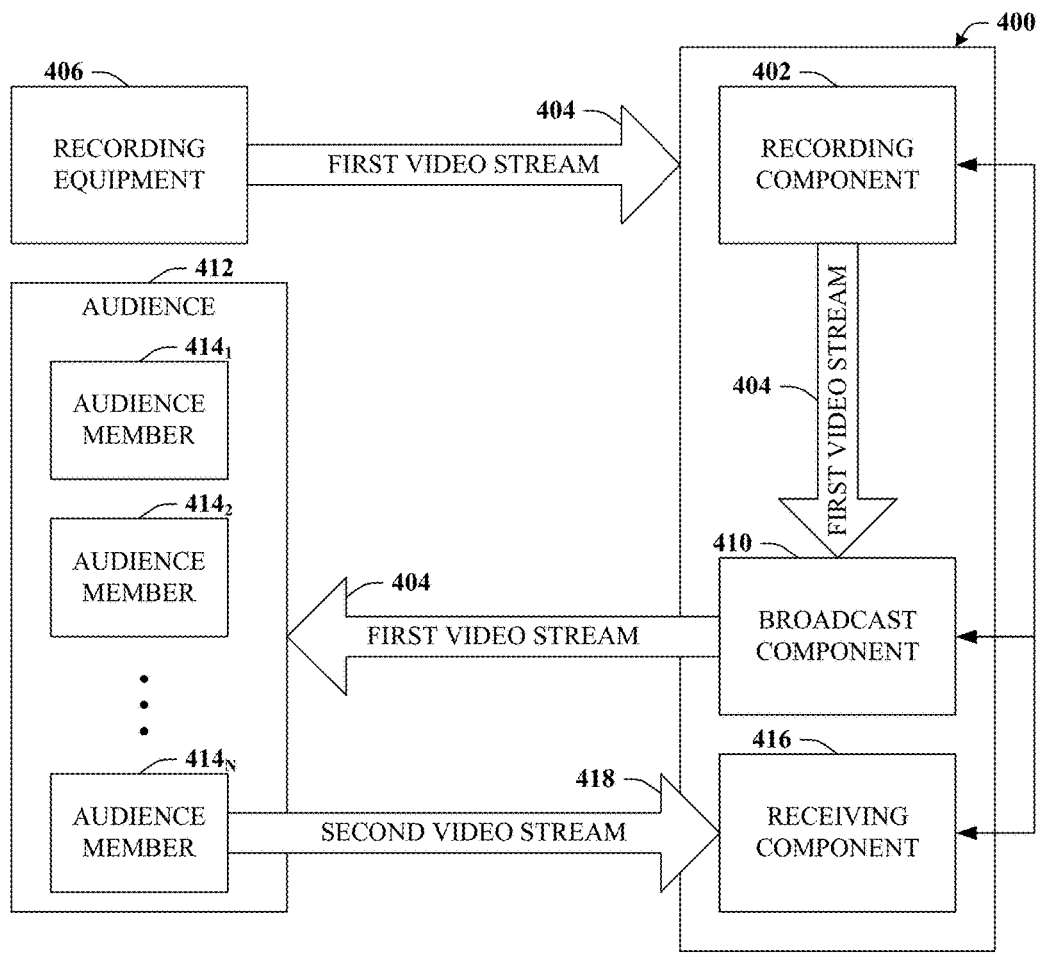
FIG. 4 illustrates a block diagram of an example system that can facilitate inclusion of a video from an audience member to a broadcaster video that is broadcast to an audience via a one-way streaming broadcast in accordance with certain embodiments of this disclosure.

FIG. 4 depicts system 400. System 400 can facilitate inclusion of a video from an audience member to a broadcaster video that is broadcast to an audience via a one-way streaming broadcast. In some embodiments, system 400 can leverage a collaborative online social service platform that provides a virtual collaboration area that is referred to herein as a backstage area or backstage. For example, members of a band can virtually meet (even when in physical proximity) backstage and prepare for a scheduled live broadcast of the performance that is distributed to an audience via one-way streaming broadcasts. Feeds that are ultimately broadcast to the audience, which might include one or more feeds extant in the backstage area, are considered onstage. Previously, access to the backstage area was an invitation-only affair, and was therefore largely independent of the audience, whose roll was limited to passive consumption of the feed. As another example, consider a political debate in which several candidates and a moderator meet in the backstage area and broadcast the debate to the audience. Still another example, consider an individual that uses the online service to broadcast in real time an analysis of data published by a recent NASA mission. It is readily apparent that interested parties (e.g., an audience for any of these broadcasts) might be highly motivated to participate beyond mere consumption, and that such can enrich the broadcast itself. However, previous systems do not provide any mechanism by which members of an audience for the broadcast can utilize the broadcast itself as a form of collaboration. In this regard, system 400 can include a recording component 402, a broadcast component 410, and a receiving component 416.

Recording component 402 can be configured to facilitate recording a first video stream 404 of an event associated with a broadcaster. For example, various recording equipment 406 can be utilized to record the event and associated data can be provided to system 400. Broadcast component 410 can be configured to facilitate transmission of a one-way streaming broadcast of first video stream 404 to a set of receiving devices that represent an audience 412 for first video stream 404. Audience 412 can include substantially any number, N, of audience members, denoted herein as audience members $414_1$-$414_N$. Audience members $414_1$-$414_N$ can represent respective devices or equipment that collectively enable receiving, decoding, presenting, and/or recording video as well as other suitable functions.

Receiving component 416 can be configured to receive a second video stream 418 associated with a member (e.g., $414_1$-$414_N$) of audience 412. For example, second video stream 418 can be a live feed associated with audience member $414_N$. Upon receipt of second video stream 418, recording component 402 can be further configured to facilitate inclusion of second video stream 418 into first video stream 404. With or without the inclusion of second video stream 418, first video stream 404 can be provided to broadcast component 410 and transmitted to audience 412 via a one-way streaming broadcast.

Figure 5:
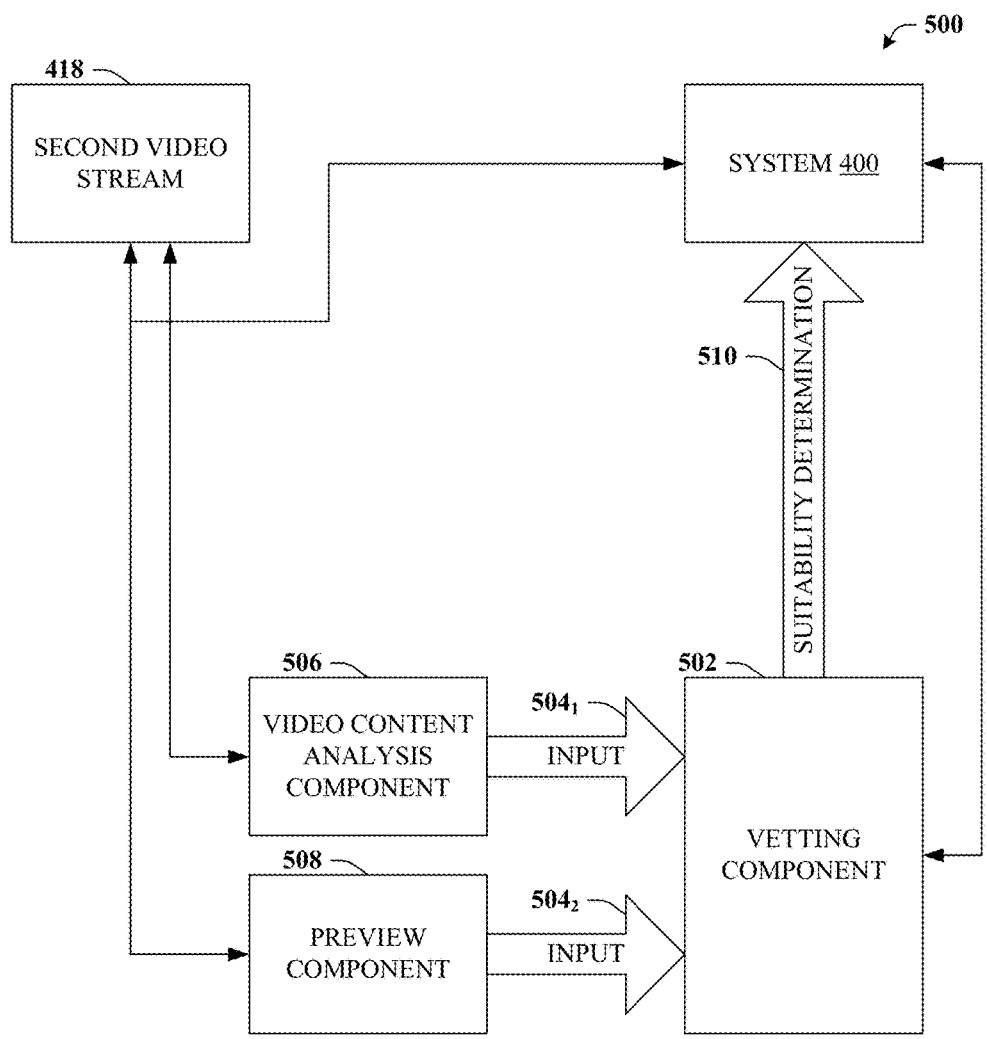
FIG. 5 illustrates a block diagram of an example system that can provide for vetting of the second video stream to determine suitability prior to inclusion in the first video stream in accordance with certain embodiments of this disclosure.

With reference now to FIG. 5, system 500 is depicted. System 500 can provide for vetting of the second video stream 418 to determine suitability prior to inclusion in the first video stream. System 500 can include all or portions of system 400. In addition, system 500 can include vetting component that can be configured to determine second video steam 418 is suitable for inclusion in first video stream 404.

In some embodiments, vetting component 502 can determine second video stream 418 is suitable based on input $504_1$ received from a video content analysis component 506. For example, video content analysis component 506 can analyze second video stream 418 in search of inappropriate content. If inappropriate content is detected, input $504_1$ can indicate such and remedial action can be initiated or prompted, including a determination that second video stream 418 is not suitable for inclusion.

In some embodiments, vetting component 502 can determine second video stream 418 is suitable based on input $504_2$ received in response to a presentation of second video stream 418. This presentation of second video stream 418 can be provided by a preview component 508 that can, e.g., enable a broadcaster or other party to make the suitability determination, which can occur while in the backstage area and prior to going onstage. Based on either or both input $504_1$ or input $504_2$, vetting component 502 can provide suitability determination 510 to system 400. It is appreciated that suitability determination 510 can be updated, either periodically or continually, as additional data for second video stream 418 is received.

Figure 6:
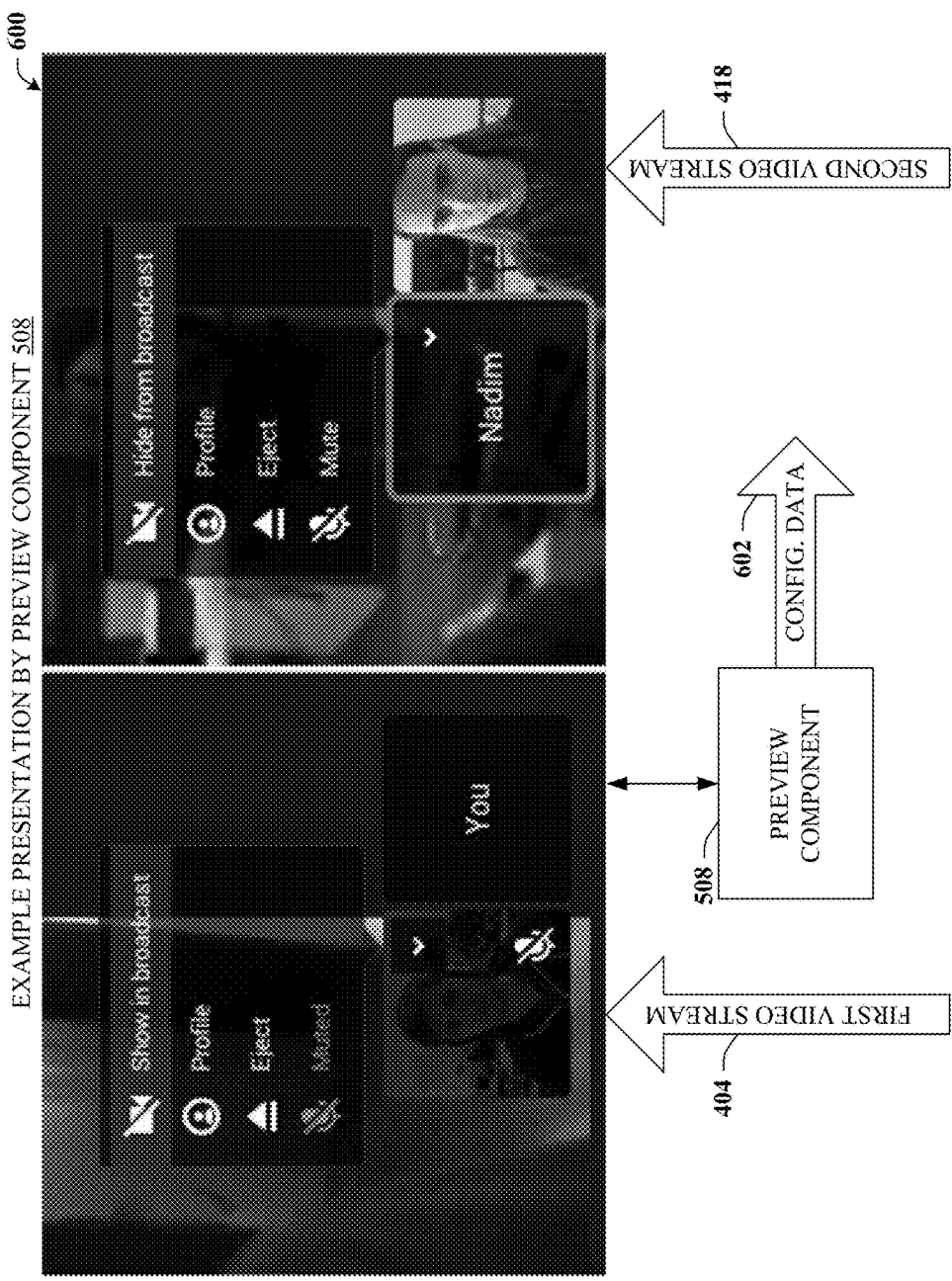
FIG. 6 represents a graphical illustration that depicts an example presentation by the preview component in accordance with certain embodiments of this disclosure.

Referring to FIG. 6, graphical illustration 600 is provided. Graphical illustration 600 depicts an example presentation by the preview component 508. In this example, preview component 508 provides a presentation of first video stream 404 (e.g., what is onstage and presently being broadcast to the audience) as well as a presentation of second video stream 418 (e.g., what is backstage and therefore potentially only received by current backstage participants). The broadcaster (or other suitable party) can determine suitability based on this preview.

In some embodiments, preview component 508 can further enable a set of actions that can be invoked in response to suitable input, potentially at any time during the collaboration and/or broadcast of first video stream 404. For example, the broadcaster can select actions relating to showing or hiding second video stream 418 from the broadcast. As another example, the broadcaster can select to review a profile for the audience member that is associated with second video stream 418. Additionally, the broadcaster can elect to eject the audience member or another backstage participant, mute the audio feed of a backstage participant and so on. Such selections can be provided to system 400 as configuration data 602.

Example Methods for Broadcast-Based Collaboration

Figure 7:
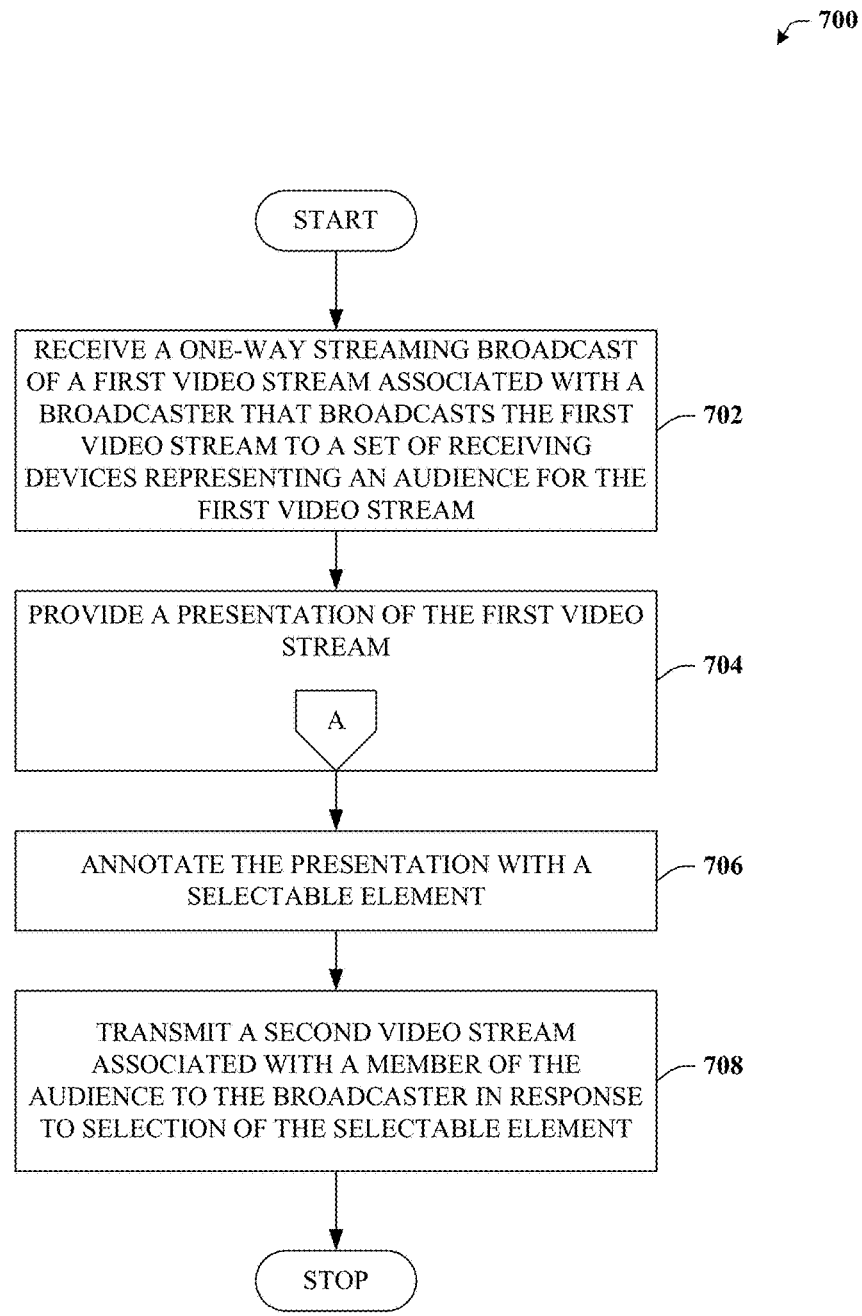
FIG. 7 illustrates an example methodology that can facilitate transmission of a video stream to a broadcaster in response to input to a content player that presents a one-way streaming broadcast from the broadcaster in accordance with certain embodiments of this disclosure.
Figure 8:
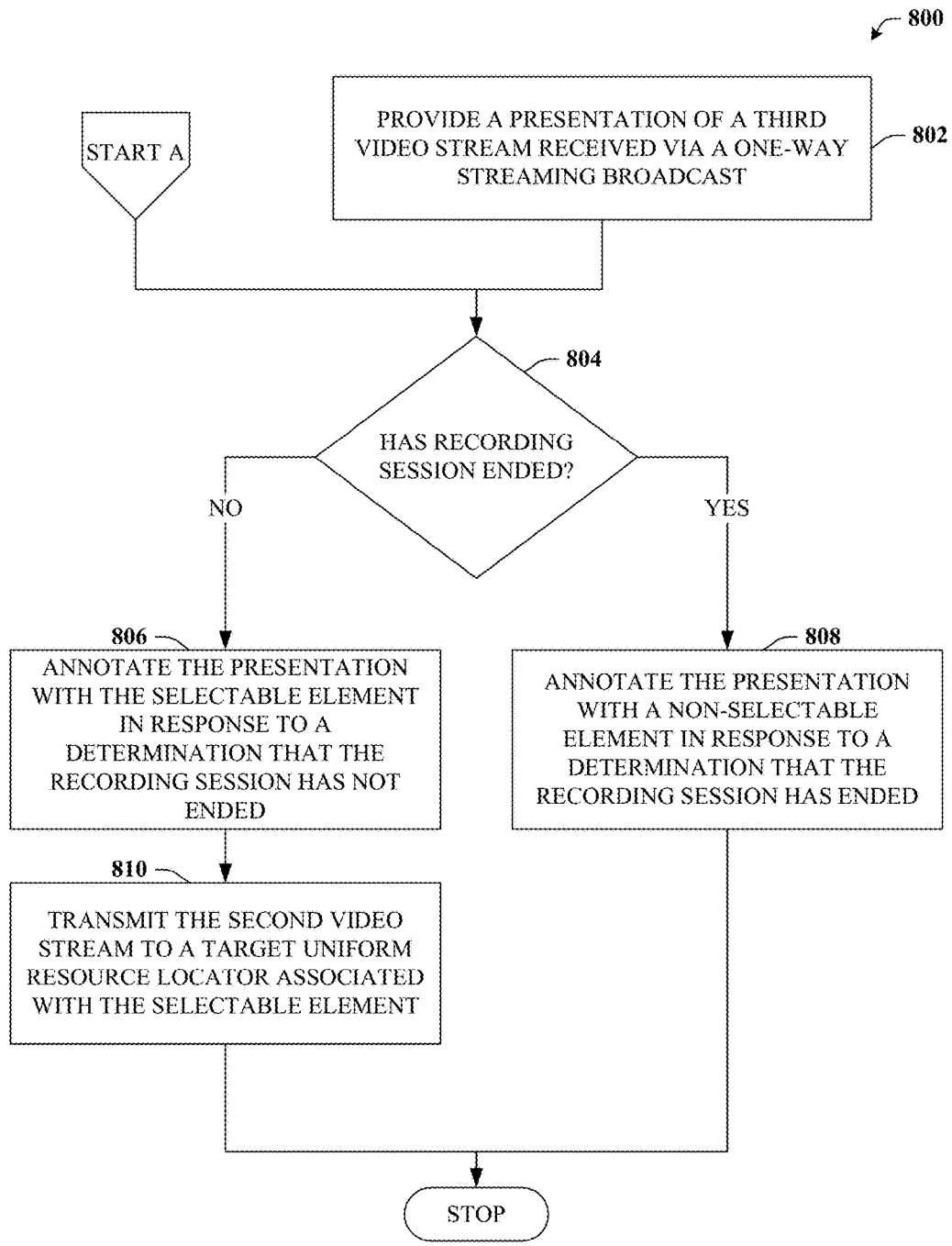
FIG. 8 illustrates an example methodology that can provide for additional features or aspects in connection with annotating the presentation in accordance with certain embodiments of this disclosure.

FIGS. 7 and 8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 7 illustrates exemplary method 700. Method 700 can facilitate transmission of a video stream to a broadcaster in response to input to a content player that presents a one-way streaming broadcast from the broadcaster. For example, at reference numeral 702, a one-way streaming broadcast of a first video stream can be received (e.g., by a receiving component associated with a member of an audience for the broadcast). The first video stream can be associated with a broadcaster that broadcasts the first video stream to a set of receiving devices representing an audience for the first video stream.

At reference numeral 704, a presentation of the first video stream can be provided (e.g., by a presentation component). For example, the presentation can be provided by a content player. Method 700 can proceed to insert A, which is detailed in connection with FIG. 8, or continue to reference numeral 706.

At reference numeral 706, the presentation of the first video stream can be annotated (e.g., by an annotation component) with a selectable element. At reference numeral 708, a second video stream can be transmitted (e.g., by a transmission component). The second video stream can be associated with a member of the audience and transmitted to the broadcaster in response to selection of the selectable element.

FIG. 8 illustrates exemplary method 800. Method 800 can provide for additional features or aspects in connection with annotating the presentation. Method 800 can begin at insert A continued from Method 700 of FIG. 7 begin at reference numeral 802. At reference numeral 802, a presentation of a third video stream received via a one-way streaming broadcast can be provided. At reference numeral 804 a determination is made as to whether a recording session has ended. If not, method 800 proceeds to reference numeral 806. If so, method 800 proceeds to reference numeral 808. In this example, it is assumed that a recording session associated with the first video stream (e.g., detailed in connection with reference numeral 704 of FIG. 7) has not ended, but a recording session for the third video stream has ended. Based on a determination of whether an associated recording session has ended, subsequent annotations can differ.

For example, since the recording session for the first video stream has not ended, the presentation of the first video stream can be annotated (e.g., by an annotation component) with the selectable element in response to a determination that the recording session has not ended for the first video stream, as described at reference numeral 806. In that case, at reference numeral 810, the second video stream (recorded by a member of the audience) can be transmitted (e.g., by a transmission component) to a target uniform resource locator (URL) associated with the selectable element. This URL can represent a network address for the backstage area provided by the collaborative online service platform.

On the other hand, since the third video stream has ended, the associated presentation need not be annotated at all. Alternatively, at reference numeral 808, the presentation can be annotated with a non-selectable element in response to a determination that the recording session has ended.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
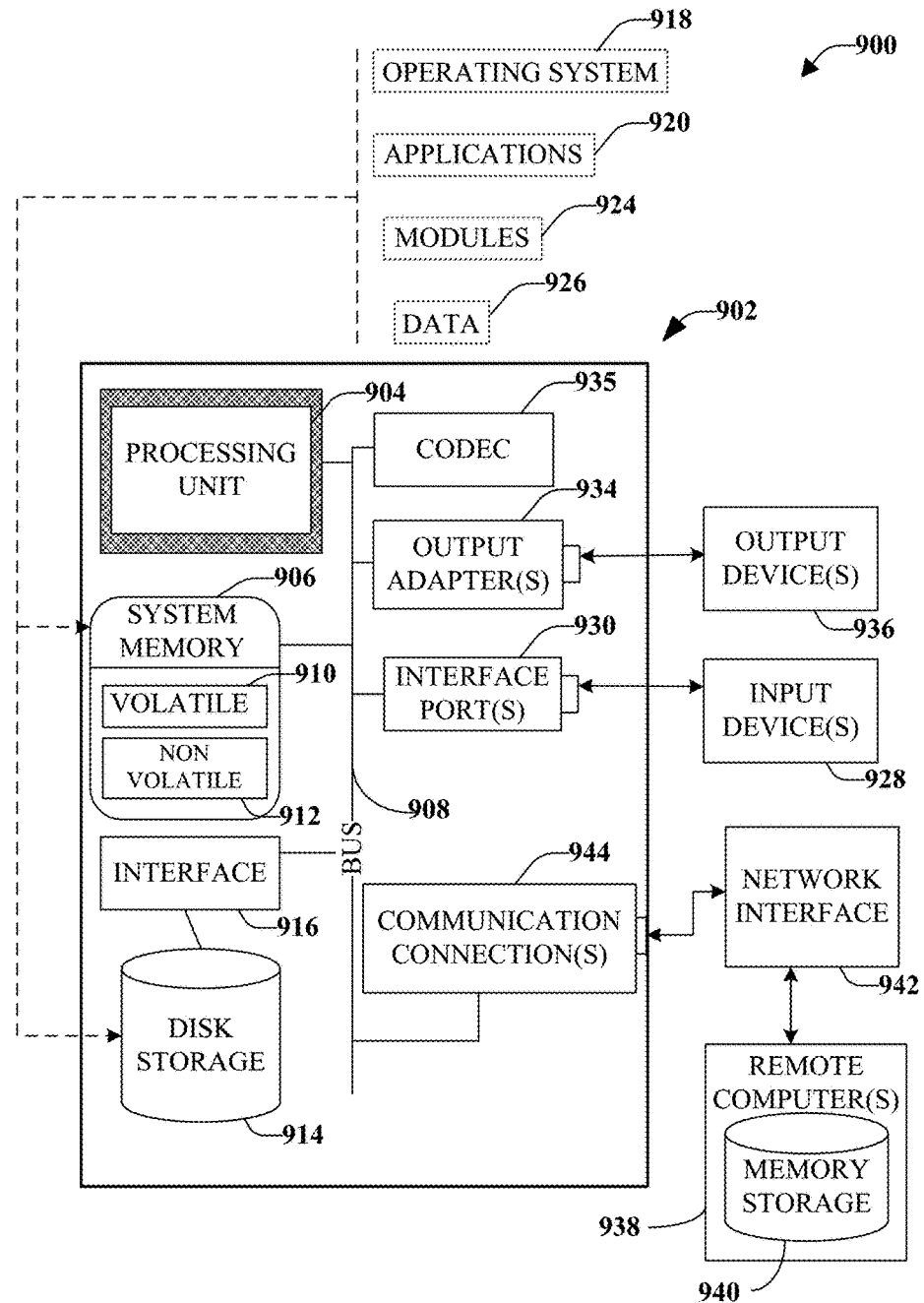
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912 or included in other components detailed herein. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to authorize having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
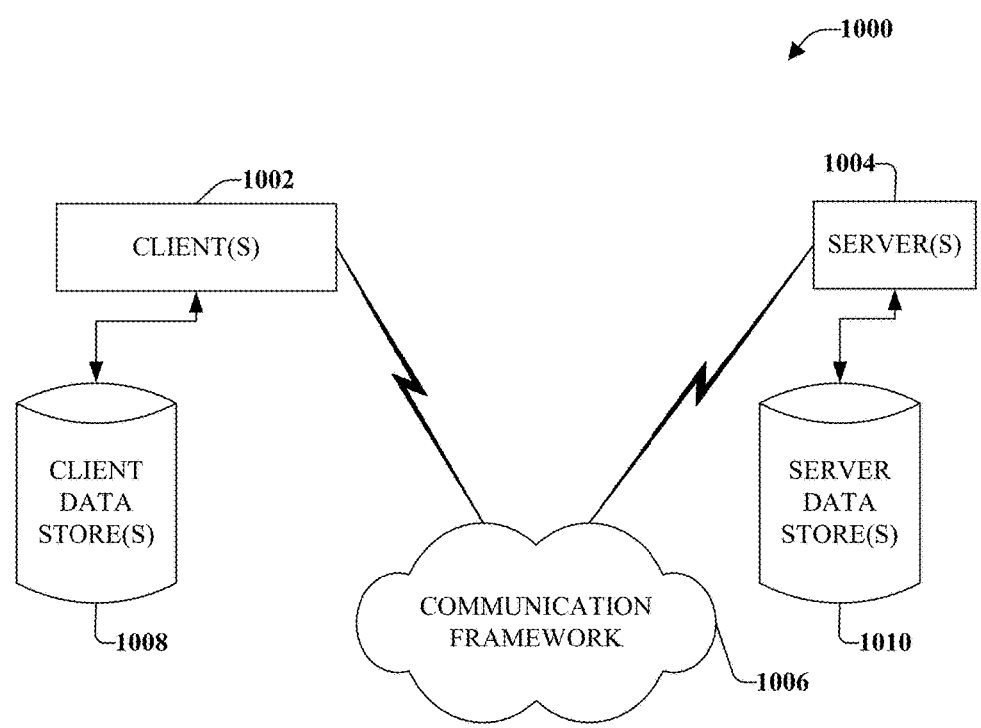
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a memory that stores computer executable components; and
   a microprocessor that executes computer executable components stored in the memory, the computer executable components comprising:
      a recording component that facilitates recording a first live video stream of an event associated with a broadcaster;
      a broadcast component that facilitates transmission of the first live video stream in a first one-way streaming broadcast to a set of receiving devices that represent an audience for the first live video stream;
      a receiving component that receives a second live video stream through an interactive communication channel that is separate from the first one-way streaming broadcast, while the first live video stream is being presented on the set of receiving devices, wherein the second live video stream is associated with a member of the audience; and
      a vetting component that determines whether the second live video is suitable for inclusion in the one-way streaming broadcast based, at least in part, on an input from a video content analysis component, wherein the video content analysis component analyzes a portion of the second live video stream, wherein the recording component facilitates further inclusion of the second live video stream with the first live video stream in the first one-way streaming broadcast, wherein the first live video stream is presented on the set of receiving devices with the second live video stream, in response to the vetting component determining that the second live video stream is suitable.

2. The system of claim 1, wherein the vetting component determines that the second live video stream is suitable further based on input received in response to a presentation of the portion of the second live video stream through the interactive communication channel.

3. The system of claim 2, wherein the input received in response to the presentation of the portion of the second live video stream comprises selection of one or more actions including showing or hiding the second live video stream, reviewing a profile for the member of the audience that the second live video stream is associated with, ejecting the member of the audience that the second live video stream is associated with, and muting an audio feed of the second live video stream.

4. The system of claim 1, wherein the vetting component further determines that a third video stream received through the interactive communication channel from another member of the audience is not suitable for inclusion in the one-way streaming broadcast.

5. The system of claim 4, wherein the vetting component analyzes the third video stream to detect inappropriate content and in response to detection of inappropriate content, determines that the third video stream is not suitable for inclusion in the first live video stream.

6. The system of claim 1, wherein the recording component stores a first recorded video of the first live video stream for transmission of the stored first recorded video in a second one-way streaming broadcast.

7. The system of claim 6, wherein the broadcast component facilitates transmission of the second one-way streaming broadcast that includes data that indicates the recording of the first live video stream has completed.

8. The system of claim 1, wherein the vetting component determines whether the second live video stream is suitable for inclusion in the first live video stream further based on content of the second live video stream.

9. The system of claim 1, wherein the member of the audience accesses the interactive communication channel through a uniform resource locator associated with the interactive communication channel.

10. A computer-implemented method comprising:
    recording a first live video stream associated with a broadcaster;
    transmitting the first live video stream in a first one-way streaming broadcast to a set of receiving devices that represent an audience for the first live video stream;
    receiving a second live video stream through an interactive communication channel that is separate from the first one-way streaming broadcast, while the first live video stream is being presented on the set of receiving devices, wherein the second live video stream is received from a receiving device of a member of the audience and the interactive communication channel is accessible by the member selecting a selectable object in the first live video stream;
    determining, by a processing device, whether the second live video stream is suitable for inclusion in the first one-way streaming broadcast, based, at least in part, on an input from a video content analysis component, wherein the video content analysis component analyzes content of the second live video stream; and in response to determination that the second live video stream is suitable, including the second live video stream in the first live video stream to continue a presentation of the first live video stream on the set of receiving devices with the second live video stream.

11. The method of claim 10, wherein determining whether the second live video stream is suitable for inclusion further comprises:

providing a presentation of at least a portion of the second live video stream through the interactive communication channel; and receiving an input in response to the presentation.

12. The method of claim 11, wherein receiving the input comprises receiving selection of one or more actions including showing or hiding the second live video stream, reviewing a profile for the member of the audience that is associated with the second live video stream, ejecting the member of the audience, and muting an audio feed of the second live video stream.

13. The method of claim 10, further comprising:

receiving a third video stream through the interactive communication channel, wherein the third video stream is associated with another member of the audience;

analyzing the third video stream to detect inappropriate content; and in response to detection of inappropriate content, determining that the third video stream is not suitable for inclusion in the first live video stream.

14. The method of claim 10, wherein the determining is performed periodically as additional data for the second live video stream is received.

15. The method of claim 10, further comprising storing a first recorded video that represents a recording of an event associated with the broadcaster for transmission of the stored first recorded video in a second one-way streaming broadcast.

16. The method of claim 15, wherein the second one-way streaming broadcast includes data that indicates the recording of the first live video stream has completed.

17. The computer-implemented method of claim 10, further comprising determining whether the second live video stream is suitable for inclusion in the first live video stream further based on input from the broadcaster.

18. The method of claim 10, wherein the member of the audience accesses the interactive communication channel through a uniform resource locator associated with the interactive communication channel.

19. A non-transitory computer-readable medium with instructions stored thereon that, when executed by a processor, cause the processor to perform operations comprising:

recording a first live video stream associated with a broadcaster;

transmitting the first live video stream in a one-way streaming broadcast to a set of receiving devices that represent an audience for the first live video stream;

receiving a second live video stream while the first live video stream is being presented on the set of receiving devices, wherein the second live video stream is associated with a member of the audience;

determining whether the second live video stream through an interactive communication channel that is separate from the one-way streaming broadcast, is suitable for inclusion in the first one-way streaming broadcast based, at least in part, on input from the broadcaster, the input received in response to a presentation of a portion of the second live video stream, the presentation provided by a preview component; and in response to determination that the second live video stream is suitable, further including the second live video stream in the first live video stream to continue a presentation of the first live video stream on the set of receiving devices with the second live video stream.

20. The computer-readable medium of claim 19, with further instructions stored thereon that cause the processor to perform operations comprising:

receiving a third video stream through the interactive communication channel, wherein the third video stream is associated with another member of the audience;

analyzing the third video stream, to detect inappropriate content; and in response to detection of inappropriate content, determining that the third video stream is not suitable for inclusion in the first live video stream.

21. The non-transitory computer-readable medium of claim 19, the processor to perform further operations comprising: determining whether the second live video stream is suitable for inclusion in the first live video stream further based on content of the second live video stream.

* * * * *